Aug. 23, 1932.  C. S. BRAGG ET AL  1,872,657
BRAKE SYSTEM FOR AUTOMOTIVE VEHICLES
Filed Sept. 1, 1928   3 Sheets-Sheet 1

Inventors
Caleb S. Bragg
Victor W. Kliesrath
By their Attorney
Louis Prevost Whitaker

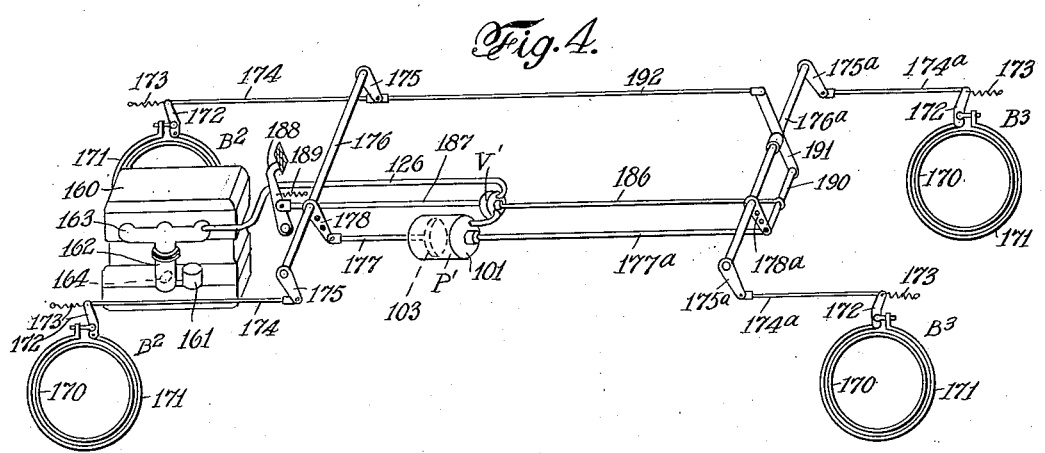
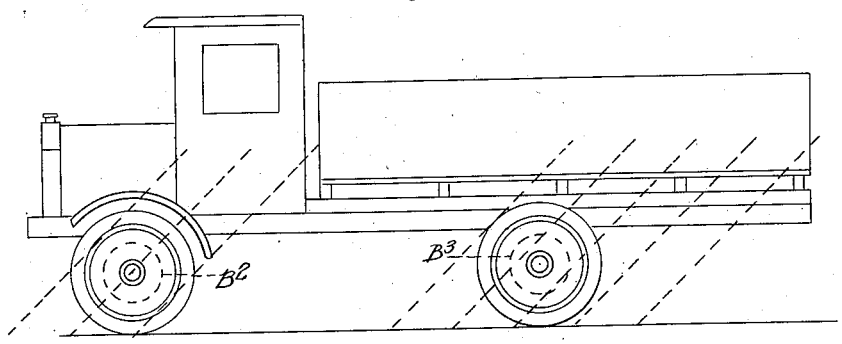
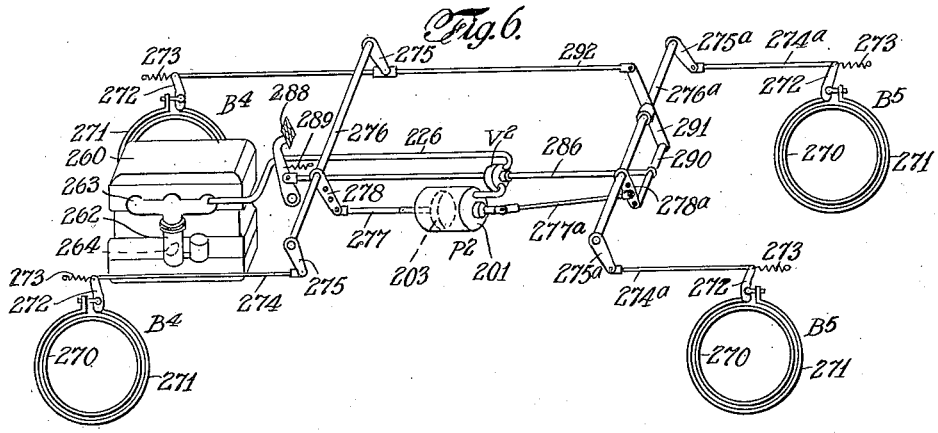

Aug. 23, 1932.     C. S. BRAGG ET AL     1,872,657
BRAKE SYSTEM FOR AUTOMOTIVE VEHICLES
Filed Sept. 1, 1928     3 Sheets-Sheet 3
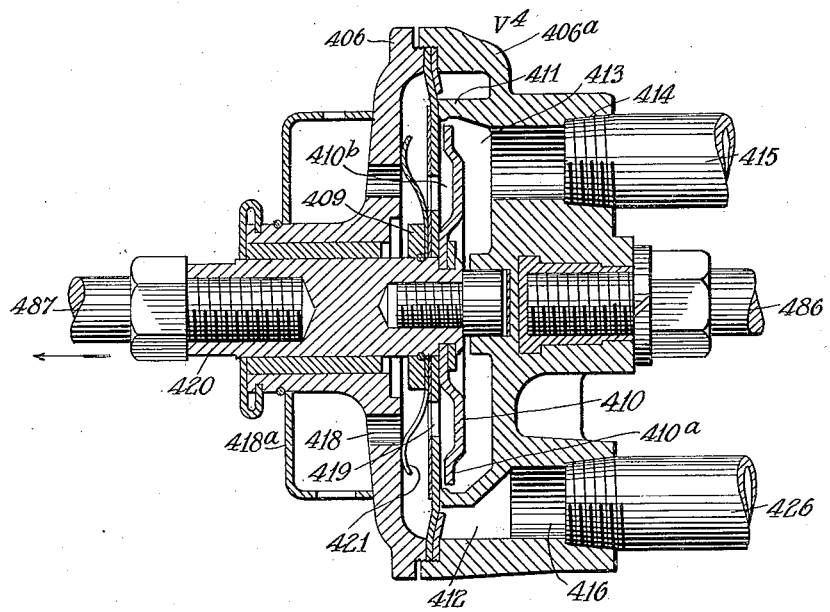
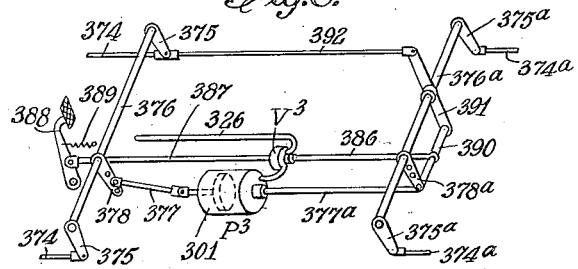
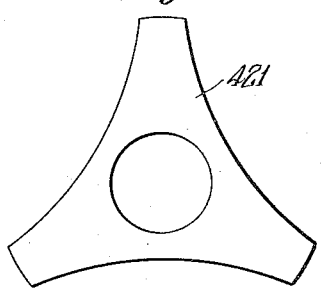
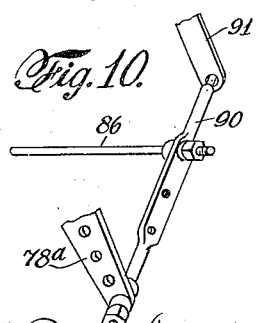

Patented Aug. 23, 1932

1,872,657

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE SYSTEM FOR AUTOMOTIVE VEHICLES

Application filed September 1, 1928. Serial No. 303,415.

Our invention consists in the novel features hereinafter described, reference being had to the accompanying drawings which show several embodiments of the same, selected by us for purposes of illustration, and the said invention is fully disclosed in the following description and claims.

In the operation of brake systems for automotive vehicles, the maximum braking effect on the wheels occurs just before the brakes are applied with sufficient force to lock the wheels. If the wheels are locked the braking effect on the vehicle is actually reduced, as the locked wheels will slide on the roadway with less retarding effect on the vehicle, and will also tend to produce skidding of the wheels laterally, which often results in serious accidents.

The coefficient of friction between the brake linings (usually asbestos lining, either woven or molded) or other friction material commonly used on automotive vehicles, and the brake drums decreases, with the development of heat, as the speed of rotation of the drums increases, and therefore greater braking force is required when the vehicle is moving rapidly than when it is moving slowly, to produce the same degree of friction between the lining and drum, and consequently a greater force may be applied to the brakes without locking the wheels when the vehicle is moving rapidly, than when it is moving slowly.

Furthermore the slowing down, as we term it, the "deceleration" of the vehicle, is accompanied by the shifting of the weight toward the forward end of the vehicle, which tends to somewhat change the normal distribution of weight between the wheels of the vehicle, and to increase the friction between the front wheels of the vehicle and the roadway. This effect is less noticeable and of comparatively little importance when the brakes are lightly applied to slightly retard the vehicle, or to stop it when it is moving slowly, but this effect is accentuated when the brakes are applied with greater force and when the vehicle is moving at high speed, and becomes maximum and of material importance in making quick or emergency stops of a rapidly moving vehicle, at which time the brakes for all of the wheels should be applied with maximum efficiency without the danger of locking the wheels at either end of the vehicle, and thereby reducing the deceleration and adding to the danger of skidding. In the operation of close coupled vehicles, such for instance as pleasure automobiles, this transfer of weight to the front wheels, due to deceleration, makes it practically impossible to obtain maximum efficiency of all the brakes, especially in making quick stops, where a predetermined proportion of power is applied at all times to each brake mechanism, and it is obviously more important to secure the fullest efficiency of the brakes when the vehicle is moving rapidly than when it is moving slowly.

It follows, therefore, that during rapid deceleration, and especially when the vehicle is moving rapidly with the accompanying transfer of weight forwardly, the brake mechanisms for the front wheels may be applied with greater force and produce greater braking efficiency without danger of locking the wheels, while the rear wheel brakes should be applied with less force than the front wheel brakes, in order to maintain their efficiency and at the same time avoid the danger of locking the rear wheels before the front wheel brakes are applied with full efficiency. On the other hand, when such a close coupled vehicle is moving slowly, even sudden or emergency stops may be made before the transfer of weight to the front wheels becomes sufficient to effect the braking operation, and therefore a less amount of power will be required to apply the front wheel brakes with maximum efficiency when the vehicle is moving slowly. In the case of longer vehicles, such as trucks and busses, for example, the greater portion of the weight of the vehicle and its load is usually carried by the rear wheels, and in such cases while there will be theoretically a slight transfer of load to the front wheels, the greater portion of the load will be at all times carried by the rear wheels.

Our present invention consists in a brake system for automotive vehicles in which two separate sources of power are provided, each of which may be applied to all of the brake mechanisms, including brake mechanisms for the front wheels and brake mechanisms for the rear wheels, one of said sources of power, which we term the primary source, being distributed to the several brake mechanisms equally, or in a predetermined proportion, so as to provide sufficient braking force, without danger of locking any of the wheels at any speed of the vehicle, or during any degree of deceleration, the other source of power, which we term the secondary source, being independently applied and distributed to all of the brake mechanisms in such a manner as to apply greater braking force to the brake mechanism for the wheels which have the greater friction between them and the roadway during the periods of maximum deceleration when the vehicle is moving at greater than slow speed. Thus, in a pleasure car for example, the brake mechanisms for the front and rear wheels may be applied substantially equally by the primary source of power, but without sufficient force to lock any of the wheels upon the average dry pavement or roadway under any conditions of deceleration or speed of the vehicle, while the secondary source of power will be applied to a greater extent to the brake mechanism for the front wheels than to the brake mechanisms for the rear wheels. The secondary source of power in the case of a vehicle with short wheel base, as a pleasure car, will thus compensate mainly for the transfer of weight to the front wheels by rapid deceleration, but it may also compensate for increases in the load carried by the vehicle. As it is far more important, as before stated, to stop a rapidly moving vehicle quickly than a slowly moving vehicle, we prefer not to apply the rear brakes with sufficient power to give maximum efficiency for sudden stops when the vehicle is moving slowly, but only with maximum efficiency when the vehicle is moving rapidly, so that there is no danger of locking the rear wheels at any time, and we further provide means for applying even greater force to the front wheel brake mechanisms in making sudden stops when the vehicle is moving rapidly than could be applied to the front wheel brake mechanisms without locking the wheels if the vehicle were moving slowly.

In the case of a motor bus or truck, or other vehicle of long wheel base, the primary source of power may be applied either equally to the brake mechanisms for the rear wheels, but without sufficient force to lock any of the wheels under any conditions of deceleration on ordinary dry pavement or roadway, while the secondary braking force will be applied to the brake mechanisms for the rear wheels to a greater extent than to the brake mechanism for the front wheels, and will compensate more particularly for increases in the load. In all cases the nature of the vehicle and its uses will determine the specific distribution of the primary and secondary power sources to the various brake mechanisms.

The secondary braking force may be brought into action before the primary braking force has been exerted to its maximum extent or after it has been exerted to its maximum extent, as may be preferred.

In the accompanying drawings we have shown a number of embodiments of our invention illustrating its application to both types of vehicles mentioned, and in these embodiments, which are selected for purposes of illustrating the invention, the primary source of power is a power actuator operated by differentials of fluid pressures conveniently obtained by using atmospheric pressure as the higher fluid pressure acting against suction or rarification as the lower fluid pressure, produced by a connection to the suction passage of an internal combustion engine employed for propelling the vehicle and connected preferably to the intake manifold between the throttle valve and the engine cylinders, the secondary source of power being the physical force of the operator applied to a suitable brake lever, as a pedal lever, which may also be operatively connected with the valve mechanism for controlling the power actuator, the connections between the pedal lever or other operator operated part and the brake mechanisms being such as to enable the operator to apply his physical force to the brake mechanisms in the manner previously described either before or after the maximum power of the actuator has been applied thereto.

In some instances, as hereinafter explained, we may provide means for applying the brakes initially by physical force and thereafter calling the power actuator into operation, in which case we prefer to provide means for applying the physical force of the operator to a greater extent after the power actuator has approached or reached its maximum effect.

It will also be understood that while we have shown our invention embodied in a brake system for a four wheel vehicle, the number of front and rear wheels is immaterial.

Referring to the accompanying drawings,

Fig. 4 is a view similar to Fig. 1, showing a brake system for motor vehicles, such as trucks and busses, in which the load is carried mainly over the rear wheels, the physical force of the operator being applied to all the brake mechanisms, but with greater force to the brake mechanisms for the rear wheels.

Fig. 5 is a view similar to Fig. 2, representing a motor truck and illustrating by dotted lines the transfer of weight of the load due to rapid deceleration, and illustrating how the greater portion of the load will nevertheless remain supported upon the rear wheels of the vehicle.

Fig. 6 is a view similar to Fig. 1, in which the power of the actuator is unequally applied to the brake mechanisms for the front and rear wheels respectively, being applied with greater force to the front wheel brakes, while the physical force of the operator is equally distributed between the front and rear wheels.

Fig. 7 is a sectional view similar to Fig. 3 showing a modified form of controlling valve mechanism provided with a resistance spring for enabling the physical force of the operator to be applied to the brakes before the actuator is brought into operation, and providing for the application of additional power by the operator after the power of the actuator has been applied to the brakes.

Fig. 8 is a diagrammatic view of a portion of a brake system similar to that shown in Fig. 6, in which the power of the actuator is unequally applied, being applied with greater force to the rear wheel brakes, while the power of the actuator is applied to all of the brake mechanisms equally.

Fig. 9 is a detail view of a spring spider used in the valve construction shown in Fig. 7.

Fig. 10 is a fragmentary view of the power distributing lever and parts shown in Fig. 1.

Figure 1:
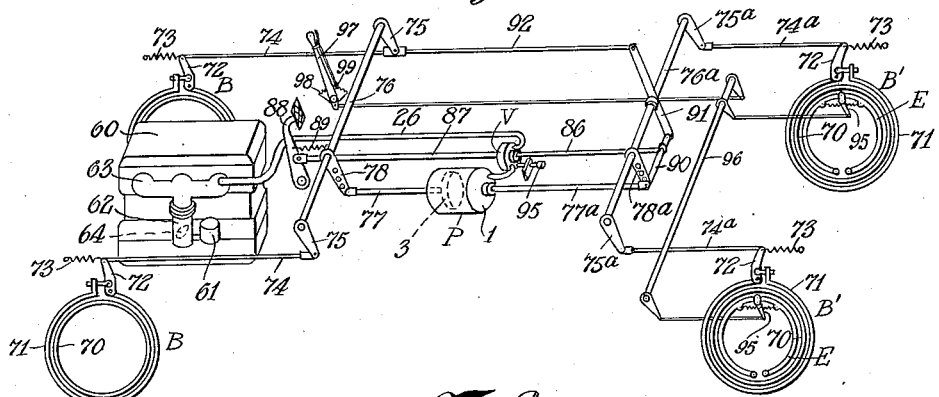
Fig. 1 represents a diagrammatic perspective view of a brake system for a comparatively short coupled vehicle, as a pleasure vehicle, in which a power actuator is connected with the brake mechanisms and the physical force of the operator is applied to the brake mechanisms, but with greater force to the brake mechanisms for the front wheels.
Figure 2:
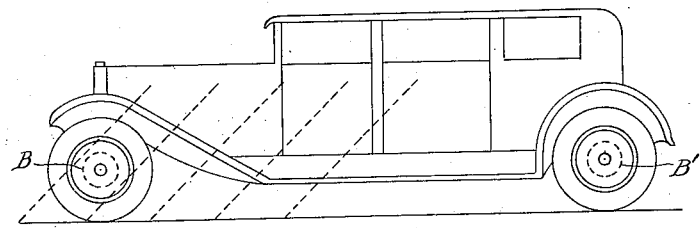
Fig. 2 is a diagrammatic elevation of the motor vehicle, dotted lines illustrating the transfer of weight to the front wheels upon rapid deceleration.
Figure 3:
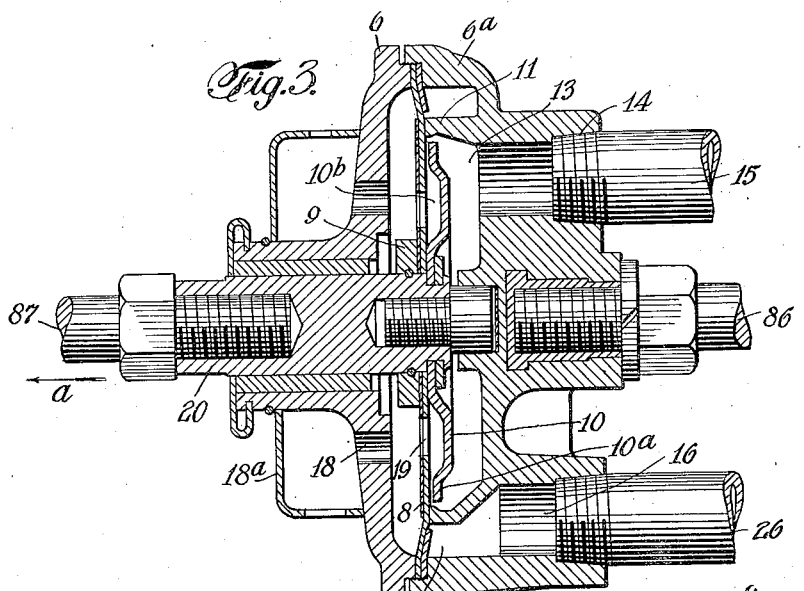
Fig. 3 is an enlarged sectional view of the controlling valve for the actuator shown in Fig. 1.

Referring to the embodiment of our invention illustrated in Figs. 1, 2, and 3, for example, the diagram, Fig. 1, shows a brake system for pleasure vehicles, having the weight of the vehicle and its passengers approximately distributed between the front and rear wheels, in which B, B, represent the brake mechanisms for the front wheels, and B', B', represent the brake mechanisms for the rear wheels. Each of the brake mechanisms which may be of any usual or preferred form, is here represented as comprising a brake drum, 70, brake band, 71, brake lever, 72, and retracting spring, 73, but any other form of brake mechanism may be employed. The brake mechanisms, B, B, are shown connected by the usual links, 74, with arms, 75, on a rock shaft, 76, and the rear brake mechanisms are similarly connected by link, 74a, and arms 75a, with a cross-shaft, 76a. In this instance we have shown a power actuator, indicated at P, as the primary source of power, said actuator comprising a cylinder, 1, piston, 3, both of which are movable with respect to the vehicle, the piston being connected by link, 77, with arm, 78, on a rock shaft, 76, while the cylinder is connected by link, 77a, with an arm, 78a, on rock shaft, 76a. In this instance the cylinder, 1, is shown closed at one end and constructed to be connected alternately with the atmosphere and with the suction passage of the engine through a controlling valve mechanism, indicated as a whole at V, the specific construction of which is illustrated in Fig. 3, but which forms no part of our present invention, as the same is covered by our former application for Letters Patent of the United States filed November 7th, 1927, and given Serial No. 231,724.

The construction of this valve mechanism will, therefore, be only briefly described for the purpose of enabling our present invention to be understood.

The controlling valve mechanism in this instance comprises a hollow casing formed in two parts, 6 and 6a, screwed together upon the edges of a diaphragm, 8, dividing the casing into two compartments. The casing member, 6a, is provided with an annular diaphragm engaging seat, 11, dividing the space within said casing member into a central chamber, 13, and an annular suction chamber, 12, when the diaphragm is seated firmly upon the seat, 11. The casing member, 6a, is provided with an aperture, 14, communicating with chamber, 13, and connected by a flexible pipe, 15, with the portion of the cylinder of the actuator between the piston and the closed end of the cylinder, the open end of the cylinder and the opposite face of the piston being at all times subjected to atmospheric pressure. The casing member, 6a, is also provided with an aperture, 16, communicating with the suction chamber, 12, and connected by means of a flexible pipe, 26, with the suction passage of the internal combustion engine between the throttle valve and the engine cylinders. We have shown the engine at 60, provided with the usual carburetor, 61, connected with the suction passage of the engine, which includes the vertical portion, 62, and the intake manifold, 63. The throttle valve is indicated in dotted lines at 64. Within the chamber, 13, of the valve casing is located a disc valve, 10, having an annular diaphragm engaging seat, 10a, and forming, when seated, a chamber, 10b, within said seat and between the diaphragm and disc valve. The casing member, 6, is provided with one or more apertures, 18, communicating with the atmosphere, preferably through an air strainer, indicated at 18a, and the diaphragm, 8, is provided with one or more apertures, 19, by which atmospheric air may pass to the space, 10b, between the diaphragm and disc valve at all times. The diaphragm and disc valve are connected rigidly and sealingly to a valve actuating part, 20, extending through an aperture in the casing member, 6, and having a limited amount of movement with respect to the valve casing in the direction of the arrow, a, Fig. 3, determined by a collar or washer, 9, on the part, 20, adapted to engage the casing member, 6, when the part, 20, has been moved far enough to bring the seat, 10a, of the disc valve, 10, into engagement with the diaphragm, 8, and disengage the diaphragm from its seat, 11. The valve mechanism for controlling the actuator is preferably located in linkage between the secondary power applying means, in this instance a pedal lever, 88, and the brake mechanisms. In this instance the valve actuating part, 20, is connected by a link, 87, with the pedal lever, 88, and the valve casing is connected by a link, 86, the rear end of which is pivotally connected with a power distributing lever, 90, at unequal distances from the opposite ends thereof, in this instance one end of the lever, 90, being connected with the arm, 78a, which is fixed with respect to the rock shaft, 76a, the other end of said lever, 90, being connected with a lever, 91, in this instance pivoted between its ends so as to be freely movable upon the rock shaft, 76a, and having its upper end connected by a link, 92, with one of the arms, 75, on the rock shaft, 76, for the front wheel brake mechanisms. The connections between the lever, 90, and the arm, 78a, and lever, 91, will be such as to permit the power of the operator to be applied unequally to said parts. As shown in Fig. 1, the link, 86, is connected to the lever, 90, at a point nearer the lever, 91, than it is to the arm, 78a, so that when the power of the operator is applied to the lever, 90, it will be distributed in greater degree to the front wheel brake mechanisms than to the rear wheel brake mechanisms, as will be readily understood. As shown in Fig. 1, the power actuator is connected to the arms, 78 and 78a, respectively, so as to apply the power of the actuator substantially equally to the front and rear wheel brake mechanisms respectively, and as both the cylinder and piston are movable the actuator parts act as an equalizer. The arms, 78 and 78a, are however, shown provided with a plurality of holes to enable the link rod, 77 and 77a, to be connected at different distances from the axis of the respective rock shafts, 76 and 76a, so that the power of the actuator may be applied to a greater extent to the front wheel brake mechanism than to the rear wheel brake mechanism, or vice versa, as may be preferred. The pedal lever is provided with the usual retracting spring, indicated at 89, in Fig. 1, and a suitable stop, indicated at 95, is conveniently provided for limiting the rearward movement of the valve mechanism, V, when the parts are in the released positions, the retracting spring, 89, serving to return the valve mechanism to the position indicated in Fig. 3, in which the disc valve, 10, is unseated, and the diaphragm, 8, is seated on the annular seat, 11. In this position of the parts the cylinder, 1, of the actuator is disconnected from the suction chamber, 12, and is in communication with the atmosphere through the apertures, 18 and 19, so that the parts of the actuator are submerged in atmosphere.

Assuming that the engine is running and the throttle valve is closed or partly closed, a rarification will be produced in the suction passage of the engine approximately that indicated by twenty inches of mercury or ten pounds per square inch at sea level, and the air will be exhausted from the suction pipe, 26, and the suction chamber, 12. As the opposite face of the diaphragm valve, 8, is at all times subjected to atmospheric pressure, the differential of fluid pressures on the diaphragm valve tends to hold it in seated position, on the seat, 11, in addition to the action of the retracting spring, 89, and in this position of the valve mechanism the disc valve, 10, is out of contact with the diaphragm valve, 8, so that the interior of the cylinder is in communication with the atmosphere.

To effect an application of the brake mechanisms the operator will move the foot pedal or other operator operated device connected with the valve mechanism forwardly, thereby shifting the valve actuating part, 20, in the direction of the arrow, Fig. 5, with respect to the valve casing. This brings the seat, 10a, of the disc valve into contact with the diaphragm, 8, shutting off communication between the cylinder and the atmosphere, and thereafter moves the diaphragm valve, 8, away from the seat, 11, thus placing the pipe, 15, leading to the cylinder in communication with the suction chamber, 12, and the evacuation of the cylinder 1, of the actuator will immediately begin. As rarification takes place within the cylinder, 1, the cylinder will move forwardly and the piston, 3, rearwardly, thereby applying all of the brake mechanisms of the vehicle in accordance with the leverages between the actuator parts and the respective brake mechanisms. Thus the power of the actuator may be distributed equally to the front and rear wheel brake mechanisms, or it may be applied with greater effect to either set of brake mechanisms according to the requirements of the installation, it being the intent in any case that the leverages shall be such that none of the brake mechanisms can be made to lock the wheels on ordinary dry pavement when the maximum force of the actuator is applied. When the brakes are applied by the force of the actuator, and especially at or near its maximum, the check of the rotation of the vehicle wheels will bring about a retardation or deceleration of the vehicle and a transfer or shift of the weight of the vehicle and its load in a forward direction with respect to the wheels. In Fig. 2 we have attempted to represent this effect of inertia of the vehicle and load in the case of a pleasure car or other short coupled vehicle, in which the weight of the vehicle is normally distributed substantially equally over the four wheels, and in which the sudden checking of the rotation of the wheels tends to shift the weight forwardly as indicated by dotted lines in that figure, which tends to necessarily increase the pressure with which the front wheels engage the road, and decrease the pressure with which the rear wheels engage the road. It is therefore obvious that under these circumstances the additional force necessary to increase the retardation or deceleration of the vehicle should be so distributed that a greater portion thereof will be applied to the brake mechanisms of the front wheels. This additional or secondary braking force is the physical force of the operator, and by reason of the connection between the link, 86, and the lever, 90, the greater portion of any physical force transmitted to the brake mechanism from the pedal lever, 88, will be applied through the lever, 91, and link, 92, to the front wheel brake mechanisms, in the arrangement shown in Fig. 1.

It will be understood that as the brakes are applied by the actuator, the valve mechanism will be moved forward or to the left with the link, 90, with which it is connected and which is connected and movable with the piston and cylinder. The pedal lever will also be moved forward as long as the operator exerts enough pressure on the pedal to hold the diaphragm valve, 8, off of its seat, 11, while the operator, by exerting greater pressure on the foot lever than that required to keep the diaphragm valve in open position, can bring the collar, 9, into engagement with the valve casing, thus taking up the lost motion provided in the valve mechanism, and can exert his physical force on all the brake mechanisms in addition to that being exerted by the actuator, which force will be distributed as before stated, in greater proportion to the front wheel brake mechanisms. The operator can thus bring this secondary braking force into operation either before the primary braking force of the actuator has reached its maximum, or thereafter, at will.

In the particular valve mechanism shown in Fig. 3, there will be a reactionary feature set forth in our prior applications above referred to in that as the rarification within the cylinder and in chamber, 13, and suction chamber, 12, increases, a differential of fluid pressure will be built up on the opposite faces of the diaphragm valve, 8, and disc valve, 10, which will act in a direction opposite to that indicated by the arrow, a. This resistance will be transmitted to the operator through the pedal lever, so that he must exert a continually increasing pressure on the pedal lever to keep the diaphragm valve in open position. This enables the operator to feel through this increased pressure against his foot, the extent to which power of the actuator is being applied to the brakes, and the increased pressure which he is obliged to exert to overcome the reactionary resistance of the valve mechanism is necessarily transmitted to the brake mechanism through the valve casing and link, 86, even before the lost motion is taken up by the engagement of the collar, 9, with the valve casing, so that in an installation in which a reactionary valve of this type is employed, the secondary braking force, i. e., the physical force of the operator, will necessarily be applied to the brake mechanisms to a certain extent before the actuator reaches its maximum efficiency.

In releasing the brake mechanisms it is only necessary for the operator to reduce the pressure on the foot pedal or remove his foot from it altogether. This permits the diaphragm and disc valve to be returned to the normal or released position under the action of the reactionary differential of fluid pressures, and the retracting spring, 89, closing off the communication between the cylinder and the suction chamber, 12, and admitting air to the cylinder. It will be understood that when the operator is applying the brake mechanisms by the power of the actuator, if he stops the forward movement of his foot and the pedal lever at any intermediate position, the movement of the brake mechanisms produced by the corresponding action of the actuator and transmitted to the valve mechanism through the link, 86, will effect the seating of the diaphragm valve, 8, before unseating the disc valve, 10, shutting off the source of suction and holding the brakes as applied. It will also be understood that the operator may apply all of the brake mechanisms by physical force alone in case there is any vacuum available for the operation of the power actuator, as in case the engine is not running, or in case the power actuator should fail to operate for any reason, and in such case the physical force of the operator would of course be applied to a greater extent to the front wheel brake mechanisms than to those for the rear wheels. Under these conditions it will be understood that the additional braking can be provided for the rear wheels by additional instrumentalities, as for example, the usual emergency brake mechanism with which most automotive vehicles are provided, and which usually consists in separate brake mechanisms for the rear wheels, operated by an emergency hand lever, for example. To illustrate this we have shown, in Fig. 1, the rear wheels provided with emergency brake mechanisms, E, E, in this instance of the internal expanding type operable by levers, 95, and operatively connected through a separate rock shaft, 96, and suitable linkage with the emergency brake lever, 97, of usual construction, provided with the usual locking means, as segment, 98, and pawl, 99.

In Fig. 4 we have shown an installation similar to that illustrated in Fig. 1, in which the front wheel brake mechanisms are indicated at $B^2$, $B^2$, the rear wheel brake mechanisms, at $B^3$, $B^3$, the power actuator at P', and the valve mechanism at V', the other parts of the apparatus which correspond with those in Fig. 1 and previously described, being given the same reference numerals with the addition of 100, to avoid repetition. The installation shown in Fig. 4 is typical of an installation for vehicles like trucks or busses, having a long wheel base and in which the greater portion of the weight of the vehicle and its load is at all times and under all conditions of deceleration supported by the rear wheels.

In Fig. 5, for example, we have illustrated a truck in which, due to its length, the greater portion of the weight of the loaded vehicle is carried by the rear wheels, and have illustrated in dotted lines the forward shift of this weight by inertia of movement when the forward movement of the vehicle is checked by retarding the rotation of its wheels. By reason of the length of this type of vehicle, even though there will be a transfer of weight forwardly, the increase of weight on the front wheels is such a small proportion of the total weight that the transfer of weight from the rear to the front wheels is almost negligible. Thus, in the brake system illustrated in Fig. 4 for such a vehicle, the power actuator, P', is connected by the desired leverages with the front and rear wheel brakes, so as to distribute the primary braking force thereof as desired, which may be either equally or with greater effect upon either the front wheels or the rear wheels, but preferably upon the rear wheels, while the secondary braking force, to wit, the physical force of the operator is transmitted in greater proportion to the brake mechanisms for the rear wheels. This is accomplished by connecting the link, 186, with the lever, 190, at a point nearer to the arm, 178a, than to the lever, 191, as clearly shown in Fig. 4. The construction and operation of the brake system illustrated in Fig 4 will be exactly the same as that previously described except that the force of the operator will always be applied in larger proportion to the rear wheel brake mechanisms than to the front wheel brake mechanisms, to compensate for the increase of weight on the rear wheels due to the increases in the weight of the load carried.

In Fig. 6 we have shown an embodiment of our invention similar to that illustrated in Fig. 1, to illustrate another modification of the invention in which the physical force of the operator when applied is distributed substantially equally between the brake mechanisms for the front wheels and those for the rear wheels, and in this instance we have shown the connections from the power actuator so arranged as to apply a greater proportion of the power of the actuator to the brake mechanisms for the front wheels. In this figure the front wheel brake mechanisms are indicated at $B^4$, $B^4$, and the rear wheel brake mechanisms at $B^5$, $B^5$, the power actuator at $P^2$, and the controlling valve mechanism therefor at $V^2$, the other parts of the apparatus which correspond with those shown in Fig. 1 being given the same reference numerals with the addition of 200. As shown in Fig. 6, the piston, 203, of the actuator is connected by link, 277, with the arm, 278, for applying the front wheel brake mechanisms, at greater leverage than that at which the link, 277a, from the cylinder is connected to the arm, 278a, for operating the rear wheel brake mechanisms. In this instance we have also shown the link rod, 286, from the casing of the valve mechanism, $B^2$, connected pivotally at the center, 290, so that the physical force of the operator when exerted will be applied substantially equally to both the front and rear wheel brake mechanisms. The operation of the brake system illustrated in Fig. 6 will be otherwise exactly the same as that previously described.

In Fig. 8 we have illustrated a partial diagram similar to the corresponding portion of Fig. 6, showing a different adjustment of the connections between the power actuator and the brake mechanisms operated thereby, the parts illustrated in this figure which correspond with those shown in Fig. 1 being given the same reference numerals with the addition of 300. In this figure the power actuator has its piston connected with the arm, 378, for operating the front wheel brake mechanisms at a shorter leverage than the connection between the link, 377a, from the actuator cylinder to the arm, 378a, so that when the power actuator is operated the rear wheel brake mechanisms will be applied with greater force than the front wheel brake mechanisms, as will be readily understood, while in this instance the physical force of the operator will be applied equally to the brake mechanisms for the front and rear wheels.

It will be understood that the various embodiments of our invention herein shown are illustrative of some of the ways in which our invention may be carried into effect, and that the connections from the power actuator to the brake mechanisms for the front and rear wheels may be such as to apply the power thereof equally to all of the brake mechanisms or unequally, in which case either the front wheel brake mechanisms or the rear wheel brake mechanisms may be applied with greater power if desired, and in like manner by varying the point of connection between the link rod from the valve casing to the distributing lever, (90, 190, 290 or 390) the power of the operator when applied may be distributed equally to all the brake mechanisms or unequally, and when so unequally distributed may be applied with greater effect to either the front wheel brake mechanisms or the rear wheel brake mechanisms, as desired.

In the embodiments of our invention hereinbefore described, the physical force of the operator, which we have termed the secondary source of power, is brought into action either after the primary source of power, to wit the actuator, has been applied to the maximum extent, or where a reactionary type of valve of the kind illustrated in Fig. 3 is employed, the power of the actuator has reached its maximum and in the examples previously described, when the operator depresses the foot lever the normal braking is effected by the power actuator as the primary source of power. In some instances, however, we may so construct the apparatus that when the operator operated part or foot lever is first operated, the power of the operator will be applied to the brake mechanisms in any one of three ways herein shown and described, while a further movement of the pedal will bring into operation the power actuator, the force of which may likewise be distributed in any one of the three ways previously described, and in such case we prefer to provide means by which additional physical force of the operator may be applied to the brake mechanisms after the maximum power of the actuator has been applied.

In Figs. 7 and 9 we have illustrated one means by which this result may be effected, Fig. 7 being a sectional view of the controlling valve mechanism for the actuator similar to that shown in Fig. 3, similar parts being given the same reference characters as those in Fig. 3 with the addition of 400. The valve mechanism is constructed exactly as previously described with reference to Fig. 3, except that a spring, which may be conveniently formed as a spider, 421, is interposed between the valve actuating part, 420, and the casing member, 406. A detail of this spring spider is shown in Fig. 9, and as illustrated in Fig. 7, the spring is clamped between the stop collar, 409, (which limits the lost motion between the valve actuating part and the valve casing) and the diaphragm, the outer portions of the spider engaging the inner face of the casing member, 406. The spring, 421, is calibrated to resist a predetermined pressure before yielding at all. It will be understood that this type of spring or its equivalent may be employed in connection with the valves, V, V', V² or V³, shown in the diagrammatic views hereinbefore described. Where this spring is employed, it naturally follows that when the operator depresses the pedal lever his physical force will be directly transmitted to the brake mechanisms for the front and rear wheels in accordance with the connection between the link rod, as 86 in Fig. 1, with the power distributing lever, 90, and all the brake mechanisms will be applied by physical force up to the critical pressure at which the spring, 421, yields, and this force will be distributed between the front wheel brake mechanisms and rear wheel brake mechanisms in the proportions desired, and as hereinbefore explained. In this manner ordinary light braking in traffic and at moderate speeds may be effected by physical force alone. As soon, however, as the operator applies more physical force than that for which the spring, 421, is calibrated, the valve actuating part, 420, will be moved in the direction of the arrow, Fig. 7, with respect to the valve casing operating the valve mechanism as previously described with reference to Fig. 3, and bringing into effect the power actuator, the force of which is applied to all the brake mechanisms and distributed between the front and rear wheel brake mechanisms in the predetermined proportion determined by the leverages in its connections therewith. It will also be seen that when the power actuator has thus been applied to its fullest capacity in addition to the power of the actuator represented by the calibration of the spring, 421, the operator may still apply further power by depressing the foot lever so as to bring the stop collar, 409, into engagement with the valve casing. In this construction also the operator can apply all of the brake mechanisms by physical force alone to the extent of his physical power in case the power actuator is not operative for any reason. The specific form of valve mechanism shown in Figs. 7 and 9 is not claimed herein as it forms the subject matter of a copending application filed August 3, 1929, Serial No. 383,221.

It will be understood that the primary power applying means, which will ordinarily be the power actuator, will be so constructed and connected with the brake mechanisms by suitable leverages, that the maximum force which can be applied to any of the brake mechanisms will not be sufficient to lock the wheels on ordinary dry roadway under any conditions of wheel load, due either to the load carried by the vehicle or the transfer of load by deceleration, and that further applications of power to the brakes must be exerted through the power applying means, which will be applied to a greater extent to those wheels to which a portion of the load is transferred by the deceleration of the vehicle, or in other words the wheels pressing with the greatest force upon the roadway, so that there is comparatively little danger of locking the wheels on one end of the vehicle before the brakes on the wheels of the other end of the vehicle have been applied with equal efficiency.

What we claim and desire to secure by Letters Patent is:—

1. In a brake system for automotive vehicles, the combination with brake mechanism for front wheels and brake mechanism for rear wheels, two separate applying means for applying said brake mechanisms, and connections from one applying means to said brake mechanisms constructed to distribute the force exerted thereby substantially equally between the brake mechanisms for the front and rear wheels, and connections from the other applying means to said brake mechanisms constructed to distribute the force exerted thereby unequally to the brake mechanisms for the front and rear wheels respectively, said applying means and connections including a single operator operated part for controlling both of said applying means.

2. In a brake system for automotive vehicles, the combination with brake mechanism for front wheels and brake mechanism for rear wheels, two separate brake applying means for applying said brake mechanisms, and connections from one of said brake applying means to said brake mechanisms for distributing the force exerted thereby in predetermined proportions to the brake mechanisms for the front and rear wheels, and connections from the other brake applying means to said brake mechanisms for distributing a greater proportion of the force exerted thereby to the brake mechanisms for the wheels to which additional portions of the load are transferred by the deceleration of the vehicle, said brake applying means and connections including a single operator operated part for controlling both of said brake applying means.

3. In a brake system for automotive vehicles, the combination with brake mechanism for front wheels and brake mechanism for rear wheels, two separate brake applying means for applying said brake mechanisms, and connections from one of said brake applying means to said brake mechanisms for distributing the force exerted thereby in predetermined proportions to the brake mechanisms for the front and rear wheels, and connections from the other brake applying means to said brake mechanisms for distributing a greater proportion of the force exerted thereby to the brake mechanisms for the wheels to which additional portions of the load are transferred by the deceleration of the vehicle, said brake applying means and connections including a single operator operated part for controlling both of said brake applying means, and constructed to apply all the brake mechanisms by one of said brake applying means before the other is brought into action.

4. In a brake system for automotive vehicles, the combination with brake mechanism for front wheels and brake mechanism for rear wheels, a brake applying means, connections therefrom to the brake mechanisms for applying them substantially equally, a second brake applying means including an operator operated part, and connections therefrom to said brake mechanisms for applying the force of the operator to the brake mechanisms for front and rear wheels respectively with unequal force after the application of the brake mechanisms by the first mentioned power applying means, and controlling mechanism for the first mentioned power applying means operatively connected with the operator operated part.

5. In a brake system for automotive vehicles, the combination with brake mechanism for front wheels and brake mechanism for rear wheels, a fluid pressure operated actuator, connections therefrom to said brake mechanisms, for applying the power of the actuator thereto to a predetermined extent as to each, an operator operated part, connections therefrom to said brake mechanisms, said connections being constructed to transmit the force of the operator to a greater extent to the brake mechanisms for wheels to which a portion of the load is transferred by the deceleration of the vehicle, controlling valve mechanism for the power actuator operatively connected with the operator operated part, the connections from the operator operated part to the brake mechanisms containing a provision for lost motion.

6. In a brake system for automotive vehicles, the combination with brake mechanism for front wheels and brake mechanism for rear wheels, a suction actuated power actuator, operative connections therefrom to said brake mechanisms, constructed to apply the force of the actuator thereto to a predetermined extent as to each, an operator operated part, connections therefrom to said brake mechanisms including a power distributing lever operatively connected with the front wheel brake mechanism and rear wheel brake mechanism for applying the physical force of the operator in predetermined proportions to the brake mechanisms for front and rear wheels respectively, and controlling valve mechanism for connecting the actuator with a source of suction and with the atmosphere, operatively connected with the operator operated part, the connections from the operator operated part to said power distributing lever including parts having a limited lost motion with respect to each other.

7. In a brake system for automotive vehicles, the combination with brake mechanism for front wheels and brake mechanism for rear wheels, a power applying means, connections therefrom to the brake mechanisms for applying them substantially equally, a second brake applying means including an operator operated part, connections therefrom to said brake mechanisms for applying the force of the operator to the brake mechanisms for front and rear wheels respectively with unequal force after the application of the brake mechanisms by the power applying means, controlling mechanism for the first mentioned power applying means operatively connected with the operator operated part, and means interposed in the connections from the second brake applying means for effecting a partial application of the brakes prior to the operation of the controlling mechanism for the power applying means.

8. In a brake system for automotive vehicles, the combination with brake mechanism for front wheels and brake mechanism for rear wheels, a power applying means, connections therefrom to the brake mechanisms for applying them substantially equally, a second brake applying means including an operator operated part, connections therefrom to said brake mechanisms for applying the force of the operator to the brake mechanisms for front and rear wheels respectively with unequal force after the application of the brake mechanism by the power applying means, controlling mechanism for the power applying means operatively connected with the operator operated part, and a spring interposed in the connections from the second brake applying means for effecting a partial application of the brakes prior to the operation of the controlling mechanism for the power applying means.

In testimony whereof we affix our signatures.

CALEB S. BRAGG.
VICTOR W. KLIESRATH.